United States Patent
Li et al.

(10) Patent No.: US 11,651,579 B2
(45) Date of Patent: May 16, 2023

(54) IMAGING SYSTEM FOR DETECTING HUMAN-OBJECT INTERACTION AND A METHOD FOR DETECTING HUMAN-OBJECT INTERACTION

(71) Applicant: OMNIVISION TECHNOLOGIES, INC., Santa Clara, CA (US)

(72) Inventors: Shimiao Li, Singapore (SG); Zhongyang Huang, Singapore (SG); Guansong Liu, Cupertino, CA (US)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 153 days.

(21) Appl. No.: 17/444,539

(22) Filed: Aug. 5, 2021

(65) Prior Publication Data
US 2023/0039867 A1 Feb. 9, 2023

(51) Int. Cl.
*G06N 3/04* (2023.01)
*G06V 10/46* (2022.01)
(Continued)

(52) U.S. Cl.
CPC .......... *G06V 10/462* (2022.01); *G06F 18/251* (2023.01); *G06N 3/04* (2013.01);
(Continued)

(58) Field of Classification Search
CPC .... G06V 10/462; G06V 10/25; G06F 18/251; G06N 3/04; H04N 23/611; H04N 23/951; H04N 23/61
(Continued)

(56) References Cited

U.S. PATENT DOCUMENTS

2020/0074163 A1* 3/2020 Zou .................. G01S 13/581

FOREIGN PATENT DOCUMENTS

WO WO-2020/195770 A1 10/2020
WO WO-2020/195822 A1 10/2020
(Continued)

OTHER PUBLICATIONS

Wang et al., "Deep Contextual Attention for Human-Object Interaction Detection," arXiv:1910.07721v1, Oct. 17, 2019, 9 pages.
(Continued)

*Primary Examiner* — Stephen P Coleman
(74) *Attorney, Agent, or Firm* — Muncy, Geissler, Olds & Lowe, P.C.

(57) ABSTRACT

The present application discloses an imaging system for detecting human-object interaction and a method for detecting human-object interaction thereof. The imaging system includes an event sensor, an image sensor, and a controller. The event sensor is configured obtain an event data set of the targeted scene according to variations of light intensity sensed by pixels of the event sensor when an event occurs in the targeted scene. The image sensor is configured capture a visual image of the targeted scene. The controller is configured to detect human according to the event data set, trigger the image sensor to capture the visual image when the human is detected, and detect the human-object interaction in the targeted scene according to the visual image and a series of event data sets obtained by the event sensor during the event.

24 Claims, 8 Drawing Sheets

(51) Int. Cl.
*G06V 10/25* (2022.01)
*G06F 18/25* (2023.01)
*H04N 23/611* (2023.01)
*H04N 23/951* (2023.01)

(52) U.S. Cl.
CPC .......... *G06V 10/25* (2022.01); *H04N 23/611* (2023.01); *H04N 23/951* (2023.01)

(58) Field of Classification Search
USPC ....................................................... 382/103
See application file for complete search history.

(56) References Cited

FOREIGN PATENT DOCUMENTS

WO    WO-2020/195966 A1    10/2020
WO    WO-2020/246186 A1    12/2020

OTHER PUBLICATIONS

Gkioxari et al., "Detecting and Recognizing Human-Object Interactions," arXiv:1704.07333v3, Mar. 27, 2018, 10 pages.
Gallego et al., "Event-based Vision: A Survey," IEEE Transactions on Pattern Analysis and Machine Intelligence, 2020, pp. 1-30, 30 pages.
Wang et al., "Learning Human-Object Interaction Detection using Interaction Points," arXiv:2003.14023v1, Mar. 31, 2020, 10 pages.
Bergstrom et al., "Human-Object Interaction Detection: A Quick Survey and Examination of Methods," HuMA'20, Oct. 12, 2020, 9 pages.
Davide Scaramuzza, "Tutorial on Event-based Cameras," Robotics and Perception Group, Department of Informatics, University of Zurich, 113 pages.

\* cited by examiner

IMAGING SYSTEM FOR DETECTING HUMAN-OBJECT INTERACTION AND A METHOD FOR DETECTING HUMAN-OBJECT INTERACTION

TECHNICAL FIELD

The present disclosure relates to an imaging system, and more particularly, to an imaging system for human-object interaction detection.

DISCUSSION OF THE BACKGROUND

Human-object interaction (HOI) detection is a technique to localize humans and objects in a given image or video, and recognize interactions between the humans and the objects. For example, detecting the HOI "human-smoking-cigarette" refers to localizing a "human," a "cigarette," and predicting the interaction "smoking" for this human-object pair. The human-object interaction detection can be adopted in a variety of applications, such as surveillance and video editing. For example, if a "human-smoking-cigarette" event has been detected by a surveillance system in a non-smoking area, a warning may be issued to remind the violator.

The human-object interaction detection is often performed with a still image. However, although the still image is suitable for human detection and object detection, it may not provide enough information for recognizing the interaction between the human and the object since it lacks temporal information for the human movement. Furthermore, if the human-object interaction detection is performed with a series of still images that capture the movement information, the computation and resources required by the human-object interaction detection would increase significantly. Therefore, how to perform the human-object interaction detection with higher efficiency and accuracy has become an issue to be solved.

This Discussion of the Background section is provided for background information only. The statements in this Discussion of the Background are not an admission that the subject matter disclosed in this section constitutes prior art to the present disclosure, and no part of this Discussion of the Background section may be used as an admission that any part of this application, including this Discussion of the Background section, constitutes prior art to the present disclosure.

SUMMARY

One aspect of the present disclosure provides an imaging system for detecting human-object interaction in a targeted scene. The imaging includes an event sensor, an image sensor, and a controller. The event sensor is configured to obtain an event data set of the targeted scene according to variations of light intensity sensed by pixels of the event sensor when an event occurs in the targeted scene. The image sensor is configured to capture a visual image of the targeted scene, wherein a field of view of the event sensor and a field of view of the image sensor are aligned. The controller is configured to detect human according to the event data set, trigger the image sensor to capture the visual image when the human is detected, and detect the human-object interaction in the targeted scene according to the visual image and a series of event data sets obtained by the event sensor during the event.

Another aspect of the present disclosure provides a method for human-object interaction detection. The method includes capturing, by an event sensor, an event data set of a targeted scene according to variations of light intensity sensed by pixels of the event sensor when an event occurs in the targeted scene, detecting human according to the event data set, triggering an image sensor to capture a visual image of the targeted scene when the human is detected, and detecting the human-object interaction in the targeted scene according to the visual image and a series of event data sets obtained by the event sensor during the event. A field of view of the event sensor and a field of view of the image sensor are aligned.

Since the imaging system and the method for detecting human-object interaction can detect the human-object interaction by using temporal information captured by the event sensor and visual information captured by the image sensor, the human-object interaction detection can have higher accuracy and lower power consumption comparing to those using only visual information or temporal information.

BRIEF DESCRIPTION OF THE DRAWINGS

A more complete understanding of the present disclosure may be derived by referring to the detailed description and claims when considered in connection with the Figures, where like reference numbers refer to similar elements throughout the Figures.

DETAILED DESCRIPTION

The following description of the disclosure accompanies drawings, which are incorporated in and constitute a part of this specification, and which illustrate embodiments of the disclosure, but the disclosure is not limited to the embodiments. In addition, the following embodiments can be properly integrated to complete another embodiment.

References to "one embodiment," "an embodiment," "exemplary embodiment," "other embodiments," "another embodiment," etc. indicate that the embodiment(s) of the disclosure so described may include a particular feature, structure, or characteristic, but not every embodiment necessarily includes the particular feature, structure, or characteristic. Further, repeated use of the phrase "in the embodiment" does not necessarily refer to the same embodiment, although it may.

In order to make the present disclosure completely comprehensible, detailed steps and structures are provided in the following description. Obviously, implementation of the present disclosure does not limit special details known by persons skilled in the art. In addition, known structures and steps are not described in detail, so as not to unnecessarily limit the present disclosure. Preferred embodiments of the present disclosure will be described below in detail. However, in addition to the detailed description, the present disclosure may also be widely implemented in other embodiments. The scope of the present disclosure is not limited to the detailed description, and is defined by the claims.

Figure 1:
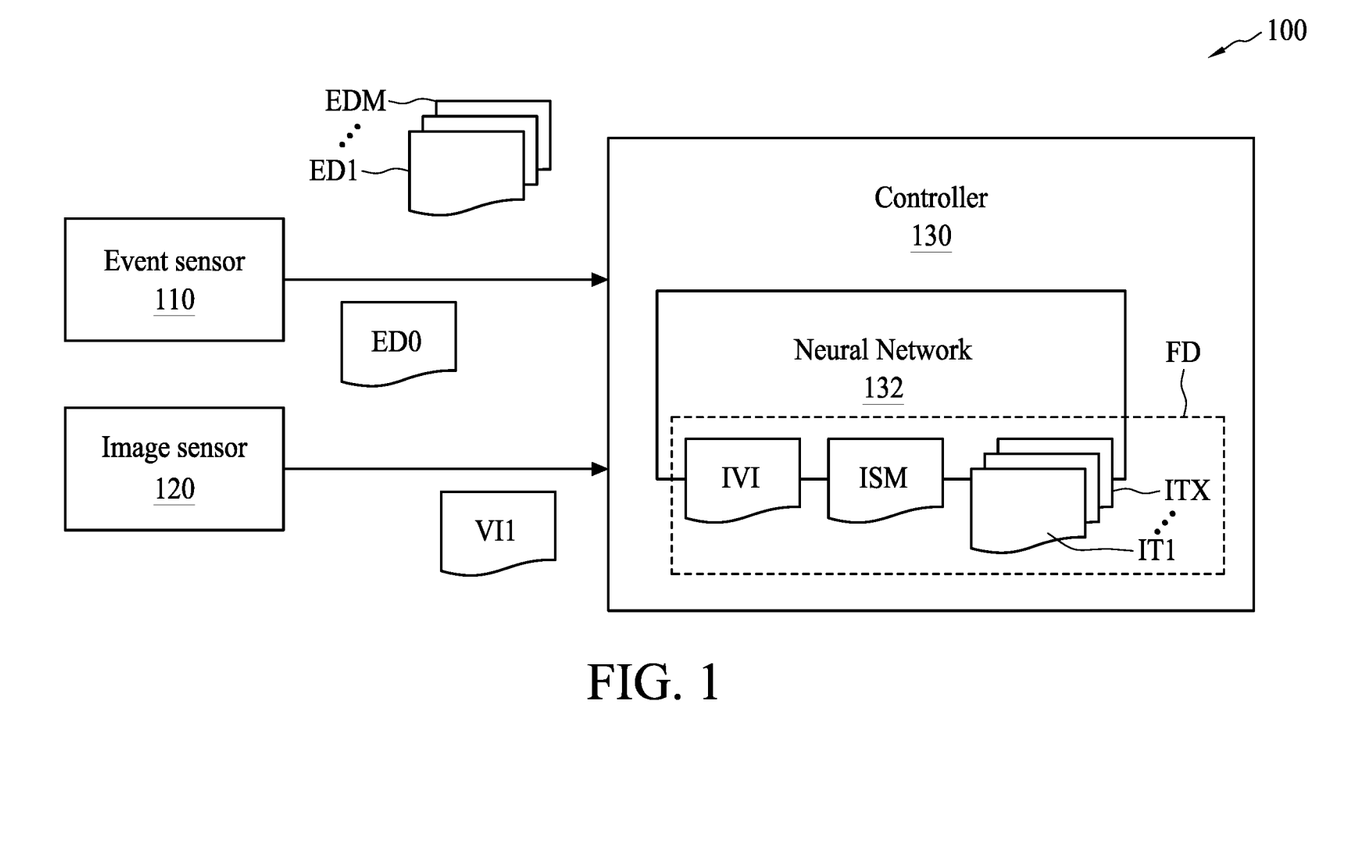
FIG. 1 shows an imaging system according to one embodiment of the present disclosure.

FIG. 1 shows an imaging system 100 according to one embodiment of the present disclosure. The imaging system 100 includes an event sensor 110, an image sensor 120, and a controller 130. In the present embodiment, the event sensor 110 and the image sensor 120 can be used to capture information of a targeted scene, and the imaging system 100 can be used to detect human-object interaction in the targeted scene according to the information captured by the event sensor 110 and the image sensor 120. The targeted scene can be a place to be monitored, for example but not limited to, an entrance of a building, a control zone of a factory, or any other interested places.

The event sensor 110 can sense variations of light intensity in a targeted scene, so whenever there is an object moves, the event sensor 110 can generate an event data set based on the variations of light intensity caused by the object moving event. For example, when an object moves from a first position to a second position within a time period, the light intensity in those two positions will both be changed. In such case, a pixel of the event sensor 110 will output a first value if it senses increase in the light intensity, and another pixel of the event sensor 110 will output a second value if it senses decrease in the light intensity. Therefore, the event data set includes coordinates of pixels that senses the changes of light intensity within such time period, and the value outputted by those pixels. In some embodiments, the first value and the second value can have the same absolute value but different signs so as to indicate varying directions of the light intensity being sensed; however, the present disclosure is not limited thereto.

Figure 2:
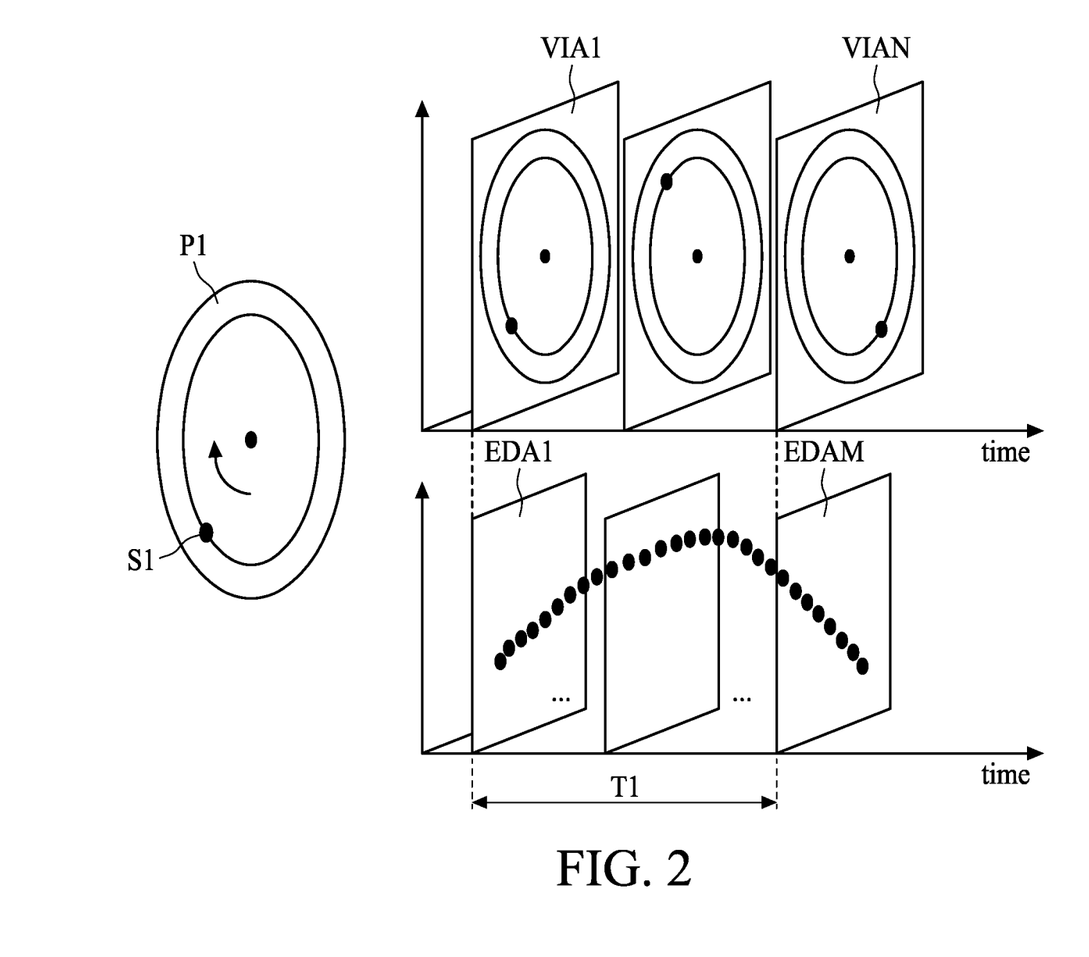
FIG. 2 shows a series of event data sets and a series of visual images for a same scene.

FIG. 2 shows a series of event data sets EDA1 to EDAM captured by the event sensor 110 and a series of visual images VIA1 to WAN captured by the image sensor 120 for a same scene. In the present embodiment, the event sensor 110 and the image sensor 120 are used to capture a rotating plate P1 Furthermore, in the present embodiment, a field of view of the event sensor 110 and a field of view of the image sensor 120 are aligned. For example, principle axes of lenses in the event sensor 110 and the image sensor 120 both aims to the center of the plate P1 and are perpendicular to the plain surface of the plate P1.

As shown in FIG. 2, the plate P1 and the reference spot S1 marked on the rotating plate P1 are both captured in each of the visual images VIA1 to VIAN. Also, in the visual images VIA1 to VIAN, positons of the reference spot S1 are changed as the plate P1 rotates. However, since the plate P1 has a symmetrical structure, the silhouette of the plate P1 will not change as the plate P1 rotates. Therefore, the event sensor 110 can only sense the movement of the reference spot S1, and thus, each event data sets EDA1 to EDAM only has pixel values corresponding to the position the reference spot S1. That is, the appearance of the plate P1 may not be shown by the event data sets EDA1 to EDAM.

Since pixels in the event sensor 110 are used to sense variation of light intensity in a scene and do not need to sense the color information, a sampling rate of the event sensor 110 can be higher than a sampling rate of the image sensor 120, and power consumption of the event sensor 110 can be lower than power consumption of the image sensor 120. Therefore, as shown in FIG. 2, during the same period of time T1, the quantity M of the event data sets EDA1 to EDAM captured by the event sensor 110 is greater than the quantity N of the visual images VIA' to VIAN captured by the image sensor 120. As a result, the event sensor 110 can record trajectories of moving objects in a more detailed manner with fewer power consumption.

In the present embodiment, the controller 130 can detect the human-object interaction according to visual information provided by the image sensor 120 and temporal motion information provided by the event sensor 120; therefore, the imaging system 100 can detect the human-object interaction with higher accuracy and higher efficiency.

Figure 3:
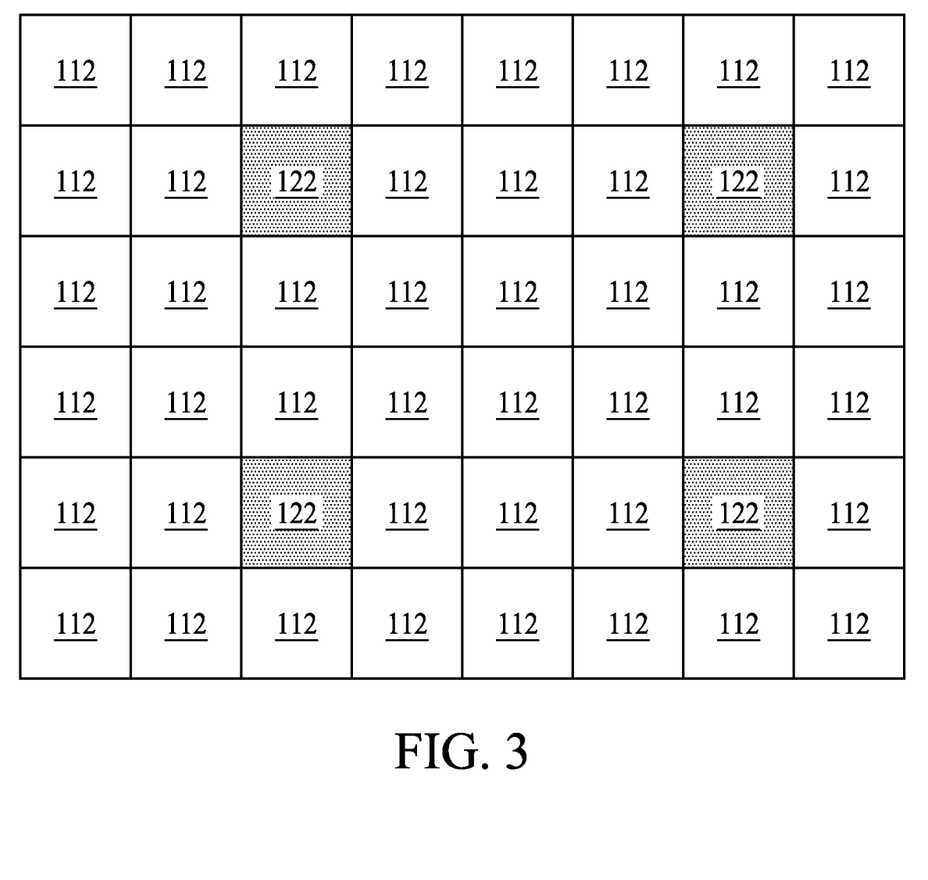
FIG. 3 shows pixel arrangement of the event sensor and the image sensor according to one embodiment of the present disclosure.

In some embodiments, the event sensor 110 and the image sensor 120 can be embedded in a same module so that the field of view of the event sensor 110 can be aligned with the image sensor 120 within the module, thereby simplifying the installment of the imaging system 100. Furthermore, since the event sensor 110 is mainly used to detect events, and does not need to capture a detail image of the targeted scene, the event sensor 110 may have a lower requirement for resolution than the image sensor 120. Therefore, in some embodiments, pixels of the event sensor 110 can be embedded in the pixel array of the image sensor 120. FIG. 3 shows pixel arrangement of the event sensor 110 and the image sensor 120 according to one embodiment of the present disclosure.

As shown in FIG. 3, the event sensor 120 and the image sensor 110 are arranged as a hybrid sensor structure, wherein pixels 122 of the event sensor 120 are marked as dotted blocks, and pixels 112 of the image sensor 110 are marked as blank blocks. In the present embodiment, pixels 112 may include pixels of different colors, such as red pixels, blue pixels, and green pixels, and may be arranged in a predetermined pattern according to the design of the image sensor 120. Furthermore, the pixels 122 are uniformly distributed among the pixels 112. In some embodiments, if the pixels 112 of the image senor 120 are arranged according to the Bayer pattern, some of the green pixels 112 may be replaced by the pixels 122 of the event sensor 110. However, the present disclosure is not limited thereto. In some other embodiments, the pixels 112 and 122 may be arranged in other patterns. Moreover, in some embodiments, the event sensor 110 and the image sensor 120 may also be formed in different modules.

Figure 4:
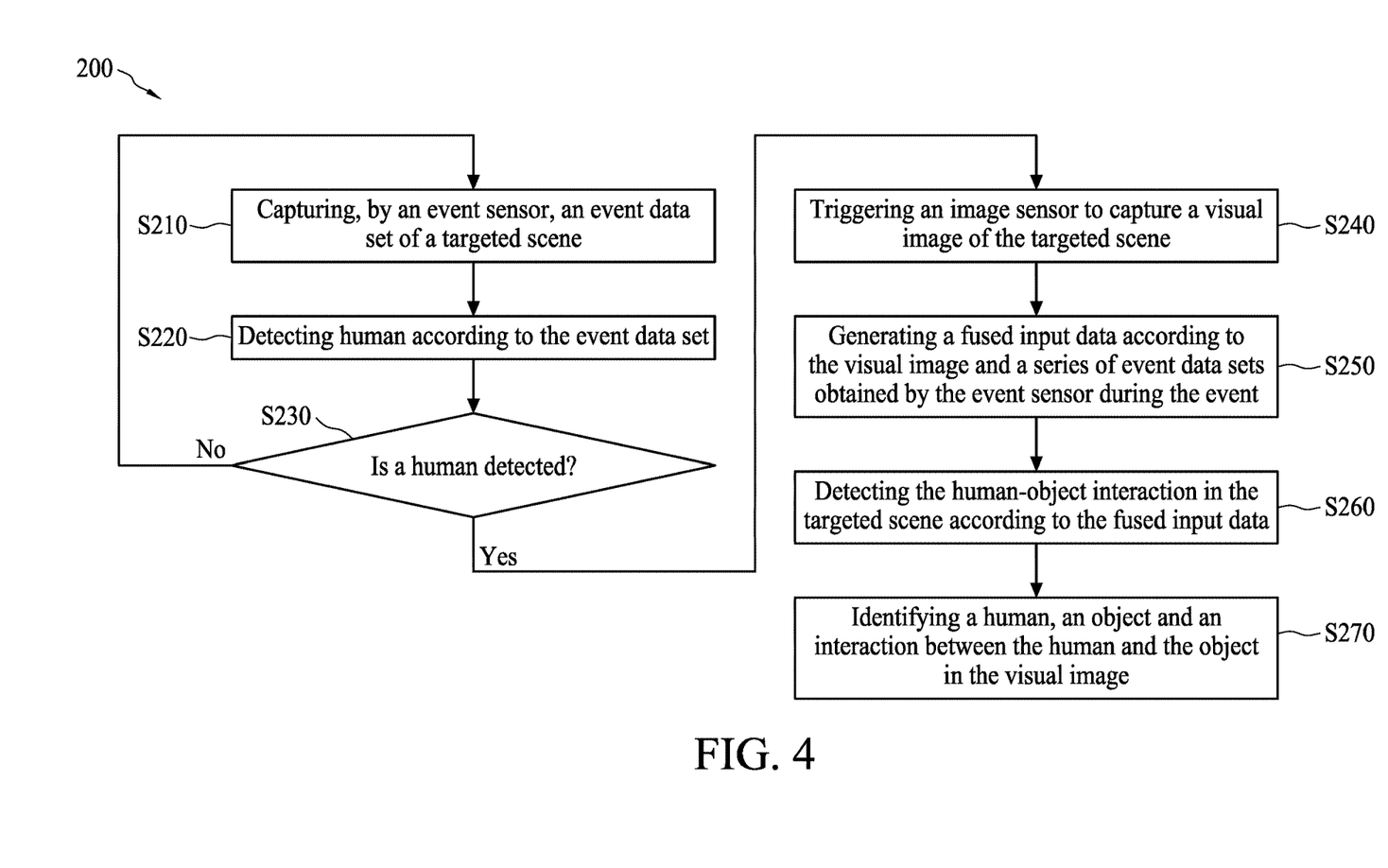
FIG. 4 shows a flowchart of a method for detecting human-object interaction according to one embodiment of the present disclosure.

FIG. 4 shows a flowchart of a method 200 for detecting human-object interaction according to one embodiment of the present disclosure. In some embodiments, the method 200 can be performed with the imaging system 100. For example, in step S210, when an event occurs in the targeted scene of the imaging system 100, the event sensor 110 would capture an event data set ED0 of the targeted scene accordingly as shown in FIG. 1. In some embodiments, if the event includes a human-object interaction, a movement of the human would be captured, and thus, a contour of the human may be derived according to the motion trajectory of the human captured by the event data set ED0. Therefore, the controller 130 can detect human according to the event data set ED0 in step S220 to check if there's a human involved in such event before the imaging system 100 determines to perform the human-object interaction detection.

In step S230, if a human is detected according to the event data set ED0, it may imply that an event involving human-object interaction has occurred in the targeted scene. In such case, in step S240, the controller 130 can trigger the image sensor 120 to capture the visual image VI1 of the targeted scene as shown in FIG. 1 for the following human-object interaction detection.

However, if no human is detected, then it may imply that there is no human involved in the event just occurred. In such case, the image sensor 120 will not be triggered, and the controller 130 will not perform human-object interaction detection correspondingly so as to save unnecessary power consumption. Furthermore, if no human is detected in step S230, then steps S210 and S220 may be performed again so that the targeted scene can be kept monitored. Since operation power of the event sensor 110 is rather low, it is quite efficient to monitor the targeted scene with the event sensor 110 in terms of both power and performance.

After the image sensor 120 is triggered to capture the visual image VI1 in step S240, the controller 130 can thus detect the human-object interaction in the targeted scene according to the visual image VI1 and a series of event data sets ED1 to EDM obtained by the event sensor 110 during the event. Since the controller 130 can trigger the image sensor 120 and detect the human-object interaction only when a human is detected according to the event data set ED0 obtained by the event sensor 110, the human-object interaction detection that requires complicated computations can be performed more cautiously in necessary situations, thereby significantly improving power efficiency of the imaging system 100. Furthermore, since the controller 130 can detect the human-object interaction according to visual information provided by the visual image VI1 and temporal motion information provided by the series of event data sets ED1 to EDM, the controller 130 can detect the human-object interaction more accurately.

Moreover, in some embodiments, the controller 130 may include an artificial intelligence (AI) model, such as a neural network 132, and in step S250, the controller 130 can generate a fused input data FD according to the visual image VI1 and the series of event data sets ED1 to EDM so that the neural network 132 in the controller 130 can detect the human-object interaction according to the fused input data FD accordingly. In some embodiments, the controller 130 may include one general purpose hardware that can execute corresponding programs to perform steps S220 to S270, that is, to control the event sensor 110 and the image sensor 120, generate the fused input data FD, and detect the human-object interaction. However, the present disclosure is not limited thereto. In some embodiments, the controller 130 may include different hardware units for different functions. For example, the controller 130 may include at least one application specific integrated circuit (ASIC) or general-purpose control circuit for controlling the event sensor 110 and the image sensor 120 and generating the fused input data FD, and may further include at least one processor that can perform corresponding software programs to implement the neural network 132 for detecting the human-object interaction. Furthermore, in some embodiments, the different hardware units of the controller 130 may be formed in different modules, and may be connected with each other through wireless and/or wired network.

Figure 5:
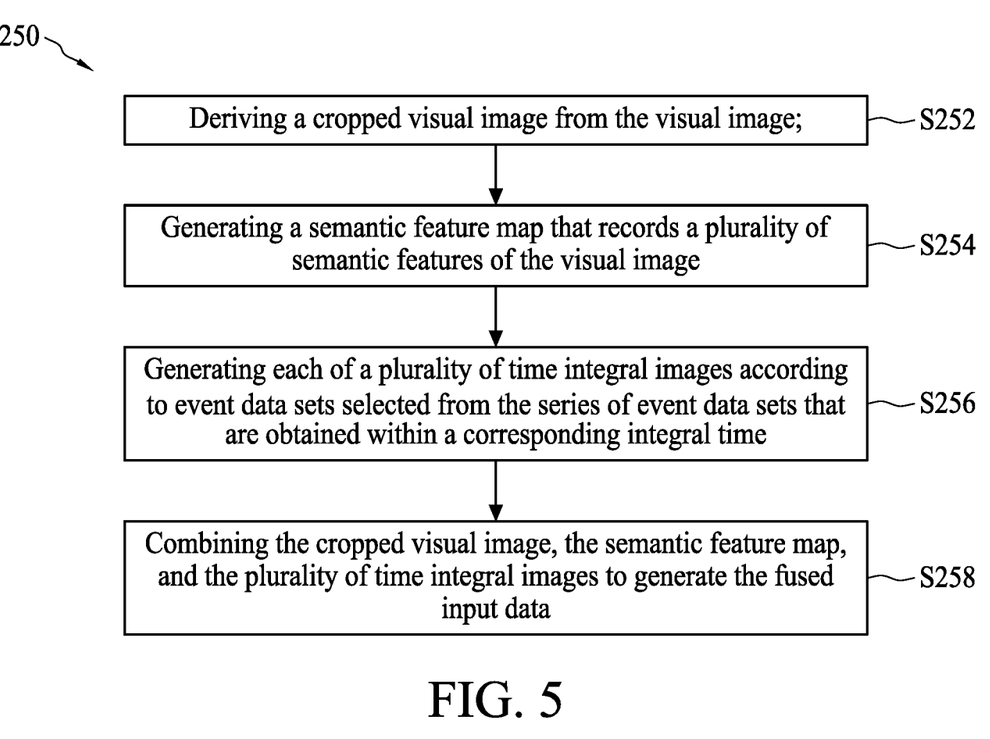
FIG. 5 shows sub-steps for generating the fused input data according to one embodiment of the present disclosure.

As shown in FIG. 1, the fused input data FD can include a cropped visual image IVI, a semantic feature map ISM, and time integral images IT1 to ITX, where X is a positive integer greater than 1. FIG. 5 shows sub-steps S252 to S258 of step S250 for generating the fused input data FD according to one embodiment of the present disclosure.

Figure 6:
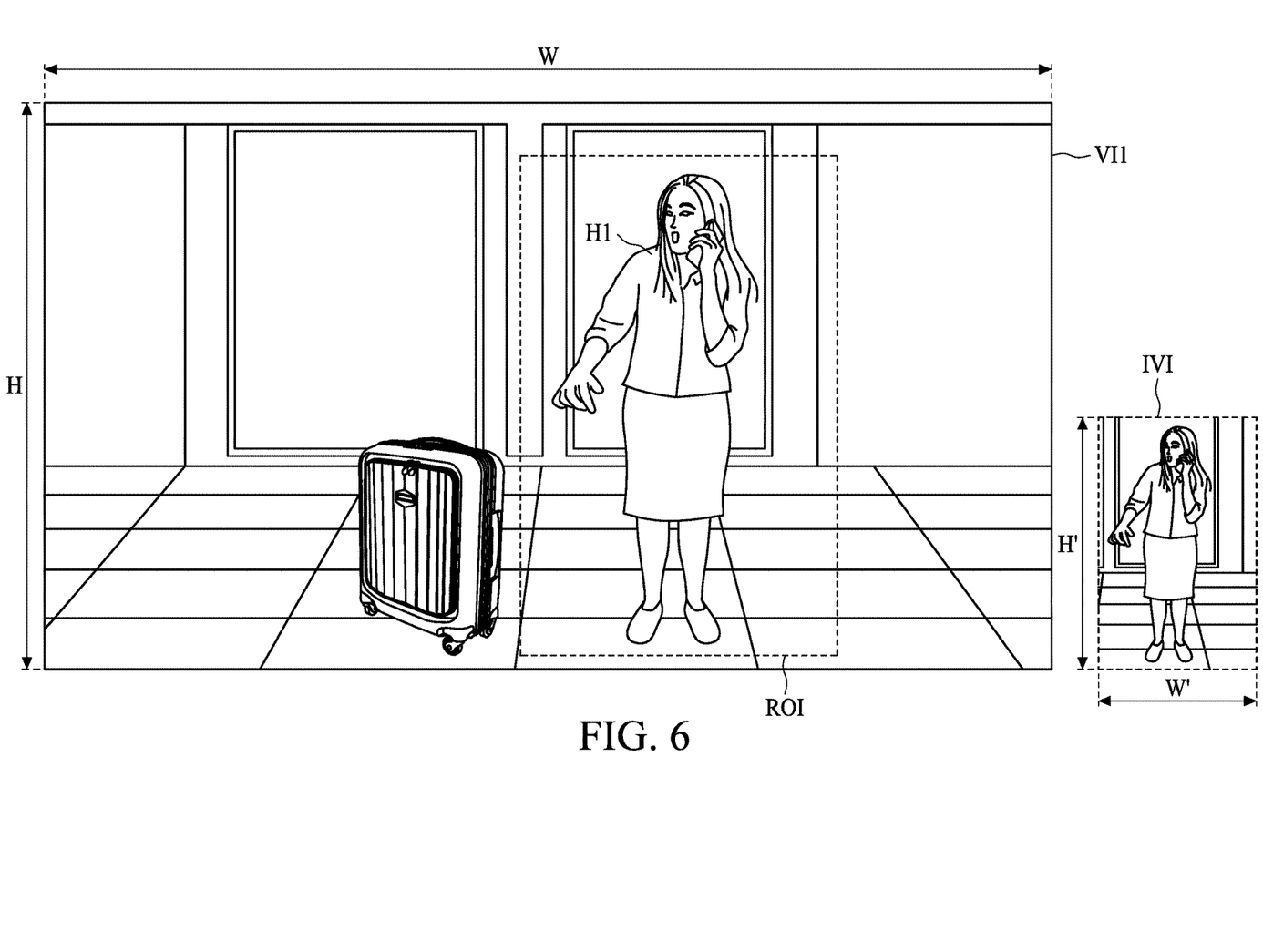
FIG. 6 shows content of the visual image according to one embodiment.

In sub-step S252, a cropped visual image IVI is derived from the visual image VI1. In some embodiments, the human in the visual image VI1 may only occupy a small region of the visual image VI1, and the rest region of the visual image VI1 is irrelevant to the human-object interaction. FIG. 6 shows content of the visual image VI1 according to one embodiment. As shown in FIG. 6, a human H1 is in the right region of the visual image Vii while no human exists in the left region of the visual image VI1. In such case, if the controller 130 uses the complete visual image VI1 for human-object interaction detection, the irrelevant information captured in the left region of the visual image VI1 may not only increase the computing burden of the controller 130 but also lower the accuracy of the human-object interaction since the irrelevant information may lead to wrong judgement.

Therefore, to improve both efficiency and accuracy of the human-object interaction detection, a cropping process may be performed to derive the cropped visual image according to the visual image VI1. In some embodiments, the controller 130 can perform a human and object detection operation according to the visual image VI1 first to define a region of interest ROI of the visual image VI1 that includes the human H1 as shown in FIG. 6, and then the controller 130 can use contents of the visual image VI1 inside the region of interest ROI as the cropped visual image IVI. As a result, a width W' of the cropped visual image IVI may be smaller than a width W of the visual image VI1, and a height H' of the cropped visual image IVI may be smaller than a height H of the visual image VI1.

In some embodiments, to ensure the object involved in the human-object interaction is also included in the cropped visual image the size of the region of interest ROI should be larger than the region occupied by the human so that the region of interest ROI can cover objects in the peripheral environment around the human. Although the cropped visual image IVI can be derived by simply cropping the part of the visual image VI1 in the region of interest ROI, the present disclosure is not limited thereto. In some other embodiments, some more image processing techniques may be adopted to derive the cropped visual image IVI according to the algorithm or AI model adopted by the imaging system 100. Furthermore, in some embodiments, if the region of interest ROI turns out covering the whole visual image VI1, then the cropping process may not be performed, and the cropped visual image IVI may have a same size as the visual image VI1.

In addition to the cropped visual image IVI, in sub-step S254, the semantic feature map ISM is generated. The semantic feature map ISM records a plurality of semantic features of the cropped visual image IVI that can be used to identify the content of the cropped visual image IVI. For example, the semantic features may include different types of image information, such as edge information, color information, and gradient information. In some embodiments, different types of semantic features may be beneficial for different applications; therefore, the user may determine to include the desired types of semantic features in the semantic feature map ISM according to the algorithm or AI model adopted by the imaging system 100.

Furthermore, during the process of human and object detection for defining the region of interest ROI in the visual image VI1, the controller 130 may have extracted some useful sematic features. Therefore, in some embodiments, the controller 130 may use the semantic features extracted during the human and object detection operation to generate the semantic feature map ISM.

However, in such case, since the human and object detection operation is performed to the visual image VI1, the controller 130 may generate a full semantic feature map that has a same spatial size W×H as the visual image VI1. Therefore, to ensure that the semantic feature map ISM is corresponding to the cropped visual image IVI, a cropping process may be performed to ensure that the semantic feature map ISM and the cropped visual image IVI are both corresponding to the same region of interest region ROI and have the same spatial size W'×H'.

For example, the controller 130 may extract the semantic features from the visual image VI1 to generate the full semantic feature map according to the human and object detection operation, and can crop the full semantic feature map to obtain the semantic feature map ISM that is corresponding to the region of interest ORI of the visual image VI1.

While the cropped visual image IVI and the semantic feature map ISM are mainly used to provide visual information, a plurality of time integral images IT1 to ITX can be generated to provide temporal information for the human-object interaction detection in sub-step S256.

In some embodiments, different human-object interactions may include actions of different speeds. For example, a human may kick a ball in a fast speed, while another human may smoke a cigarette in a slower pace. Furthermore, some of human-object interactions may include both high speed actions and low speed actions. For example, when a human talks on a phone, his/her lips may move quickly while his/her hand that holds the phone may move slowly. In such cases, temporal information captured in time periods of different lengths can be helpful for detecting the human-object interaction. Therefore, in the present embodiment, the time integral images in to ITX can be generated according to event data sets selected from the event data sets ED1 to EDM that are obtained within integral periods of different lengths.

Figure 7:
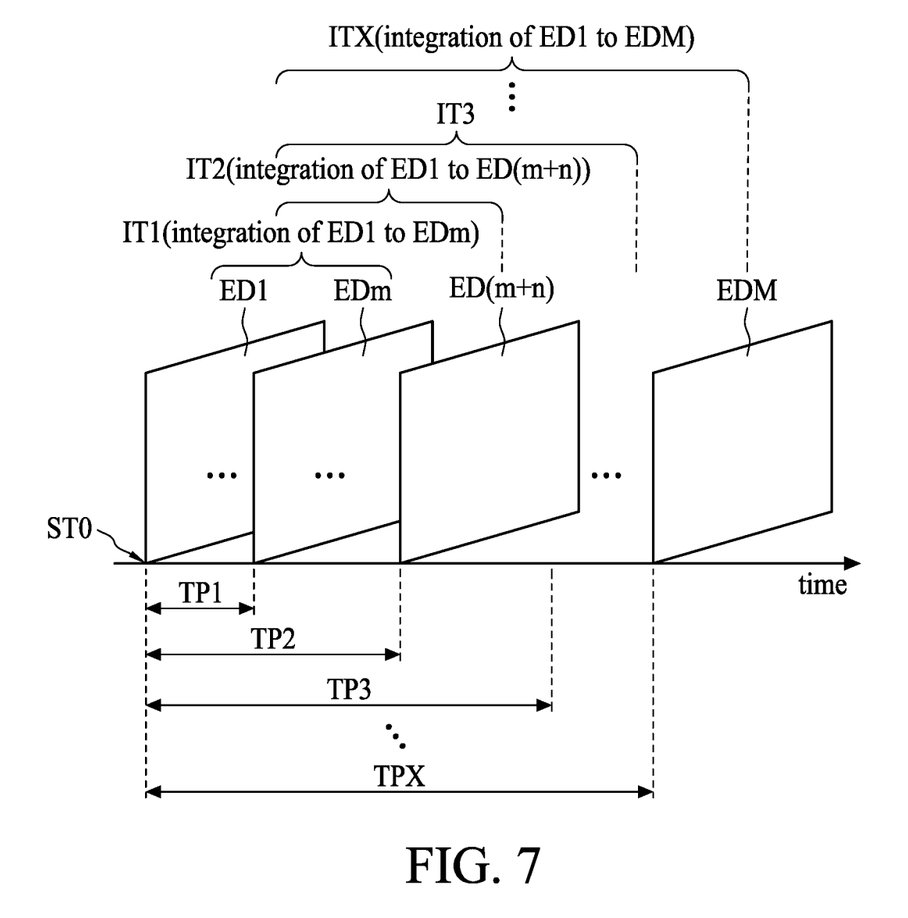
FIG. 7 shows the relation between event data sets and time integral images according to one embodiment of the present disclosure.

FIG. 7 shows the relation between event data sets ED1 to EDM (I.e. ED1, ED2, EDM) and time integral images IT1 to ITX according to one embodiment of the present disclosure. Please note that only ED1, EDm, ED(m+n) and EDM are shown in FIG. 7 for brevity. As shown in FIG. 7, the time integral image IT1 can be generated by integrating the event data sets ED1 to EDm that are obtained within a first integral period TP1, where M and m are integers greater than 1 and m is smaller than M. In the present embodiment, the event data sets ED1 to EDm can be integrated by accumulating the pixel values recorded in the event data sets ED1 to EDm so that the motion trajectory of the human within the first integral period TP1 can be recorded in the time integral image IT1 Similarly, the time integral image IT2 can be generated by accumulating the pixel values recorded in the event data sets ED1 to ED(m+n), and the time integral image ITX can be generated by accumulating the pixel values recorded in the event data sets ED1 to EDM.

Furthermore, the time integral image IT2 can be generated by integrating the event data sets ED1 to ED(m+n) that are obtained within a second integral period TP2, where n is a positive integer and (m+n) is smaller than M. That is, the second integral period TP2 is longer than the first integral period TP1, and the first integral period TP1 is within the second integral period TP2. Similarly, the time integral images IT3 to ITX can be generated according to event data sets selected from the event data sets ED1 to EDM that are obtained within integral periods TP3 to TPX.

As shown in FIG. 7, the integral periods TP1 to TPX all have the same start time ST0, which is the time point when the event data set ED1 is captured. Furthermore, in some embodiments, to ensure that time integral images IT1 to ITX are temporally corresponding to the visual image VI1, the start time ST0 can be determined according the time when the visual image VI1 is captured. For example, the start time ST0 can be substantially the same time when the image sensor 120 is triggered to capture the visual image VI1 or when the visual image VI1 is captured.

In addition, the integral periods TP1 to TPX are monotonically increasing. That is, the integral period TP2 is greater than the integral period TP1, the integral period TP3 is greater than the integral period TP2, and so on. For example, the lengths of integral periods TP1 to TPX can be an exponential sequence with a base 2. That is, the integral period TP2 can be two times the integral period TP1, the integral period TP3 can be two times the integral period TP2, and so forth. However, the present disclosure is not limited thereto.

Moreover, to ensure that the time integral images IT1 to ITX are corresponding to the cropped visual image IVI, a cropping process to may be performed to ensure that the time integral images IT1 to ITX and the cropped visual image IVI are all corresponding to the same region of interest region ROI and have the same spatial size W'×H'.

In some embodiments, the controller 130 can generate a plurality of full time integral images that have the same spatial size as the visual image VI1, and crop the full time integral images to obtain the time integral images IT1 to ITX that are corresponding to the region of interest ROI of the visual image VI1 In some embodiments, the resolution provided by the image sensor 120 may be higher than the resolution provided the event sensor 110. For example, as shown in FIG. 3, the quantity of pixels 112 of the event sensor 110 is smaller than the quantity of pixels 122 of the image sensor 120, and thus, the resolution of the event sensor 110 is smaller than the resolution of the image sensor 120. In such case, the controller 130 may upsample the full time integral images to raise the resolution of the full time integral images to be same as the resolution of the visual image VI1, so the controller 130 can crop the full time integral images according to the region of interest ROI defined in the visual image VI1 to generate the time integral images IT1 to ITX precisely later.

After the cropped visual image IVI, the semantic feature map ISM, and the time integral images IT1 to ITX are prepared, the controller 130 can further combine the cropped visual image IVI, the semantic feature map ISM, and the time integral images IT1 to ITX to generate the fused input data FD in sub-step S258, Consequently, the fused input data FD can be fed to the neural network 132 of the controller 130 for human-object interaction detection as described in step S260 shown in FIG. 4.

However, the present disclosure is not limited to generate the fused input data FD by sub-steps S252 to S258 shown in FIG. 5. In some embodiments, the controller 130 may adopt another algorithm or another model instead of using the neural network 132. In such case, the fused input data FD may include other types of images or data. Furthermore, in some embodiments, the controller 130 may detect the human-object interaction in the targeted scene according to the visual image VI1 and the series of event data sets directly. In such case, step S250 may be omitted.

Figure 8:
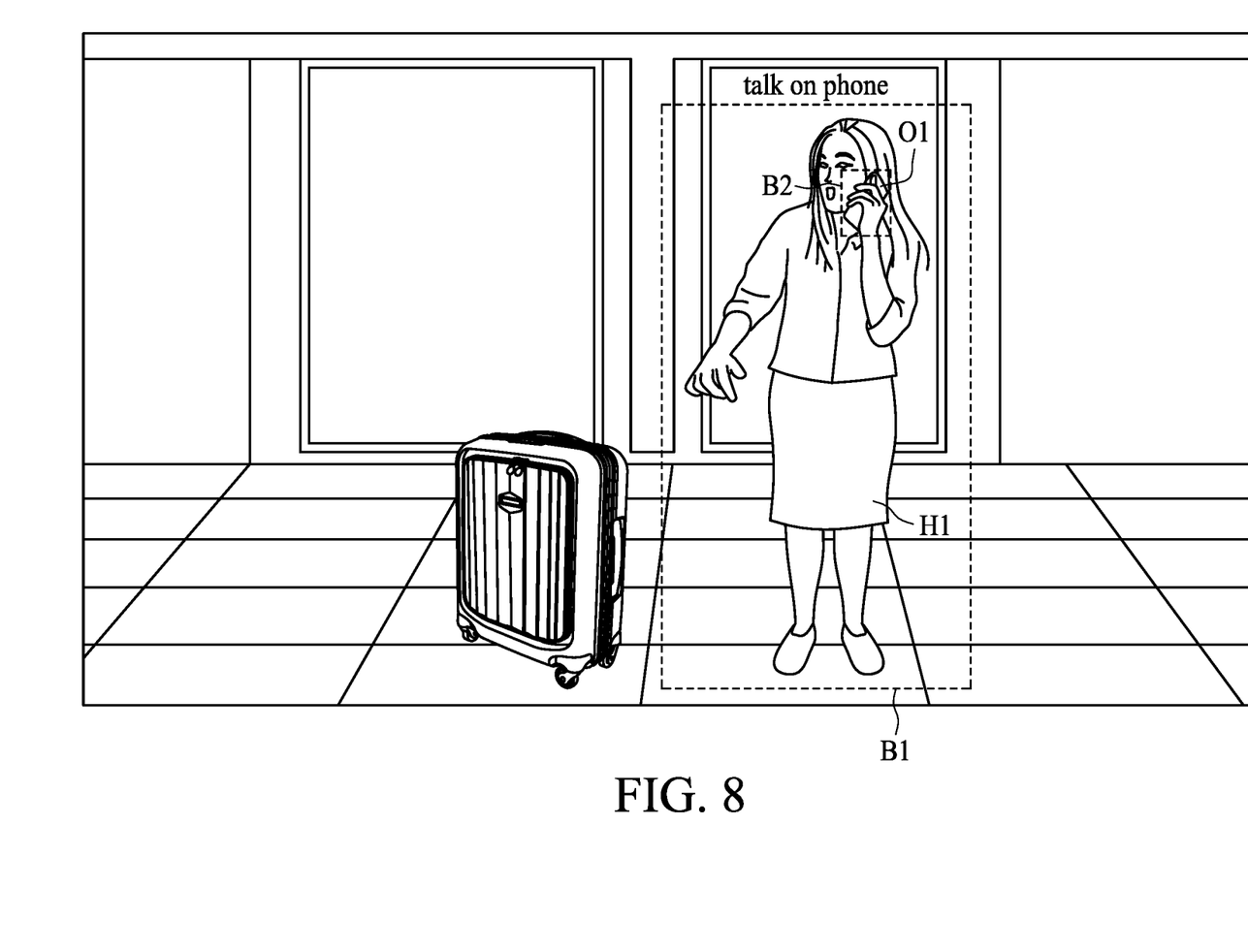
FIG. 8 shows a result of the human-object interaction detection.

After the human-object interaction is detected in S260, the controller 130 can further identify the human, the object and the interaction in the visual image VI1 in step S270 so as to show the result of human-object interaction detection. FIG. 8 shows a result of the human-object interaction detection. As shown in FIG. 8, the controller 130 can mark the human H1 by a first block B1, and mark the object O1 by a second block B2. Furthermore, the controller 130 can further put a notation on the visual image VI1 to indicate the interaction between the human H1 and the object O1 is "talk on phone".

Since the imaging system 100 can capture both temporal information and visual information by using the event sensor 110 and the image sensor 120, the controller 130 can detect the human-object interaction with higher accuracy and lower power consumption comparing to those using only visual information or temporal information. Furthermore, the imaging system 100 can trigger the image sensor 120 only when a human is detected according to the event data captured by the event sensor 110; therefore, the imaging system 100 is able to save unnecessary power, and thus become even more power efficient.

In summary, the imaging system and the method for detecting human-object interaction provided by the embodiments of the present disclosure can detect the human-object interaction by using temporal information captured by the event sensor and visual information captured by the image sensor, so the human-object interaction detection can have higher accuracy and lower power consumption comparing to those using only visual information or temporal information.

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed, that perform substantially the same function or achieve substantially the same result as the corresponding embodiments described herein, may be utilized according to the present disclosure. Accordingly, the appended claims are intended to include within their scope such processes, machines, manufacture, compositions of matter, means, methods, and steps.

What is claimed is:

1. An imaging system for detecting human-object interaction in a targeted scene, wherein the imaging system comprises:
   an event sensor configured to obtain an event data set of the targeted scene according to variations of light intensity sensed by pixels of the event sensor when an event occurs in the targeted scene;
   an image sensor configured to capture a visual image of the targeted scene, wherein a field of view of the event sensor and a field of view of the image sensor are aligned; and
   a controller configured to detect human according to the event data set, trigger the image sensor to capture the visual image when the human is detected, and detect the human-object interaction in the targeted scene according to the visual image and a series of event data sets obtained by the event sensor during the event.

2. The imaging system of claim 1, wherein a sampling rate of the event sensor is greater than a sampling rate of the image sensor.

3. The imaging system of claim 1, wherein the controller is further configured to identify a human, an object and an interaction between the human and the object in the visual image after detecting the human-object interaction in the targeted scene.

4. The imaging system of claim 1, wherein the event sensor is embedded in the image sensor.

5. The imaging system of claim 1, wherein the controller detect the human-object interaction in the targeted scene according to visual information provided by the visual image and temporal motion information provided by the series of event data sets.

6. The imaging system of claim 1, wherein the controller is further configured to generate a fused input data according to the visual image and the series of event data sets obtained by the event sensor.

7. The imaging system of claim 6, wherein the controller comprises a neural network configured to detect the human-object interaction in the targeted scene according to the fused input data.

8. The imaging system of claim 6, wherein the fused input data comprises:
   a cropped visual image derived from the visual image;
   a semantic feature map that records a plurality of semantic features generated of the visual image; and
   a plurality of time integral images, wherein each of the plurality of time integral images is generated according to event data sets selected from the series of event data sets that are obtained within a corresponding integral period.

9. The imaging system of claim 8, wherein:
   a first time integral image of the plurality of time integral images is generated according to first event data sets selected from the series of event data sets that are obtained within a first integral period;
   a second time integral image of the plurality of time integral images is generated according to second event data sets selected from the series of event data sets that are obtained within a second integral period; and
   the second integral period is longer than the first integral period, and the first integral period is within the second integral period.

10. The imaging system of claim 8, wherein the controller is further configured to perform a human and object detection operation according to the visual image to define a region of interest of the visual image, and use contents of the visual image inside the region of interest as the cropped visual image.

11. The imaging system of claim 10, wherein the controller is further configured to:
   extract semantic features from the visual image to generate a full semantic feature map according to the human and object detection operation, and
   crop the full semantic feature map to obtain the semantic feature map that is corresponding to the region of interest of the visual image.

12. The imaging system of claim 10, wherein the controller is further configured to:
   generate each of a plurality of full time integral images by integrating the event data sets selected from the series of event data sets that are obtained within the corresponding integral time period; and
   crop the plurality of full time integral images to obtain the plurality of time integral images that are corresponding to the region of interest of the visual image.

13. The imaging system of claim 12, wherein:
   a resolution provided by the image sensor is higher than a resolution provided the event sensor;

the controller is further configured to upsample the plurality of full time integral images to raise a resolution of the plurality of full time integral images to be same as a resolution of the visual image.

14. A method for human-object interaction detection comprising:
    capturing, by an event sensor, an event data set of a targeted scene according to variations of light intensity sensed by pixels of the event sensor when an event occurs in the targeted scene;
    detecting human according to the event data set;
    triggering an image sensor to capture a visual image of the targeted scene when the human is detected, wherein a field of view of the event sensor and a field of view of the image sensor are aligned; and
    detecting the human-object interaction in the targeted scene according the visual image and a series of event data sets obtained by the event sensor during the event.

15. The method of claim 14, further comprising identifying a human, an object and an interaction between the human and the object in the visual image after detecting the human-object interaction in the targeted scene.

16. The method of claim 14, wherein detecting the human-object interaction in the targeted scene according the visual image and the series of event data sets obtained by the event sensor during the event comprises detecting the human-object interaction in the targeted scene according to visual information provided by the visual image and temporal motion information provided by the series of event data sets.

17. The method of claim 14, further comprising generating a fused input data according to the visual image and the series of event data sets obtained by the event sensor during the event.

18. The method of claim 17, wherein detecting the human-object interaction in the targeted scene according the visual image and the series of event data sets obtained by the event sensor during the event is detecting the human-object interaction in the targeted scene according the fused input data by using a neuro network.

19. The method of claim 17, wherein generating the fused input data according to the visual image and the series of event data sets obtained by the event sensor during the event comprises:
    deriving a cropped visual image from the visual image;
    generating a semantic feature map that records a plurality of semantic features of the visual image;
    generating each of a plurality of time integral images according to event data sets selected from the series of event data sets that are obtained within a corresponding integral time; and
    combining the cropped visual image, the semantic feature map, and the plurality of time integral images to generate the fused input data.

20. The method of claim 19, wherein:
    a first time integral image of the plurality of time integral images is generated according to first event data sets selected from the series of event data sets that are obtained within a first integral period;
    a second time integral image of the plurality of time integral images is generated according to second event data sets selected from the series of event data sets that are obtained within a second integral period; and
    the second integral period is longer than the first integral period, and the first integral period is within the second integral period.

21. The method of claim 19, wherein deriving the cropped visual image from the visual image comprises:
    performing a human and object detection operation according to the visual image to define a region of interest of the visual image; and
    using contents of the visual image inside the region of interest as the cropped visual image.

22. The method of claim 21, wherein generating the semantic feature map that records the plurality of semantic features of the visual image comprises:
    extracting semantic features from the visual image to generate a full semantic feature map according to the human and object detection operation, and
    cropping the full semantic feature map to obtain the semantic feature map that is corresponding to the region of interest of the visual image.

23. The method of claim 21, wherein generating each of the plurality of time integral images according to the event data sets selected from the series of event data sets that are obtained within the corresponding integral time comprises:
    generating each of a plurality of full time integral images by integrating the event data sets selected from the series of event data sets that are obtained within the corresponding integral time period; and
    cropping the plurality of full time integral images to obtain the plurality of time integral images that are corresponding to the region of interest of the visual image.

24. The method of claim 23, wherein a resolution provided by the image sensor is higher than a resolution provided by the event sensor, and the method further comprises:
    upsampling the plurality of full time integral images to raise a resolution of the plurality of full time integral images to be same as a resolution of the visual image.

* * * * *